W. O. LARMUTH.
WIRE STRANDING MACHINE.
APPLICATION FILED OCT. 15, 1910.

1,073,052.

Patented Sept. 9, 1913.

4 SHEETS—SHEET 1.

Witnesses:
Willa A. Burrowes
Walter R. Cullinger

Inventor—
William Oliver Larmuth.
by his Attorneys—
Howson & Howson
Henry Howson

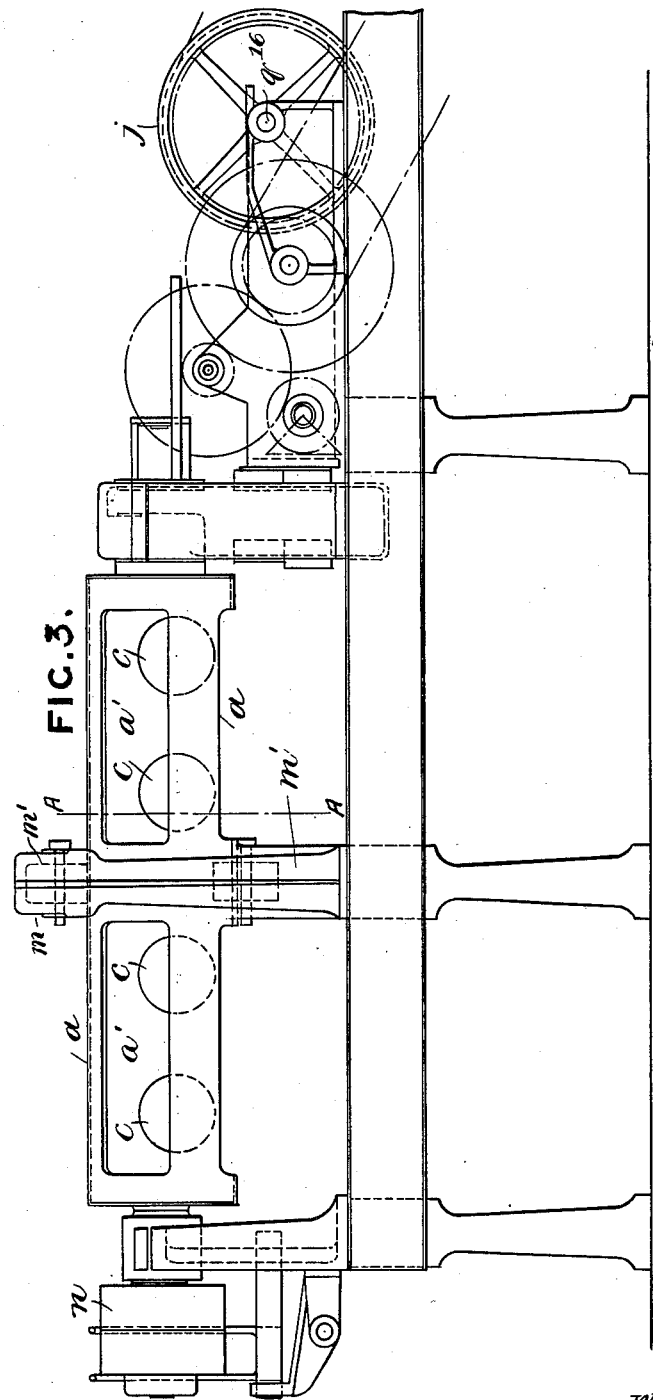

W. O. LARMUTH.
WIRE STRANDING MACHINE.
APPLICATION FILED OCT. 15, 1910.

1,073,052.

Patented Sept. 9, 1913.

4 SHEETS—SHEET 3.

Witnesses
Willa A. Burrowes
Walter R. Pullinger

Inventor,
William Oliver Larmuth.
by his Attorneys,
Howson & Howson
Henry Howson

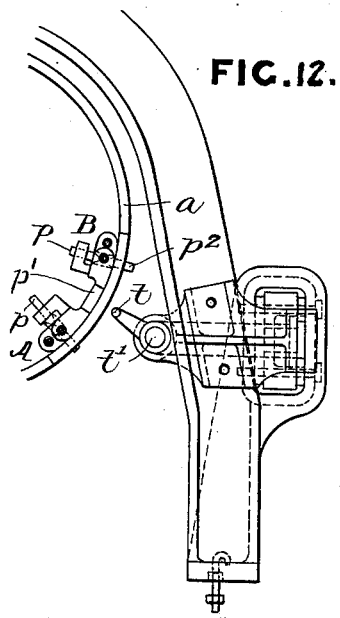
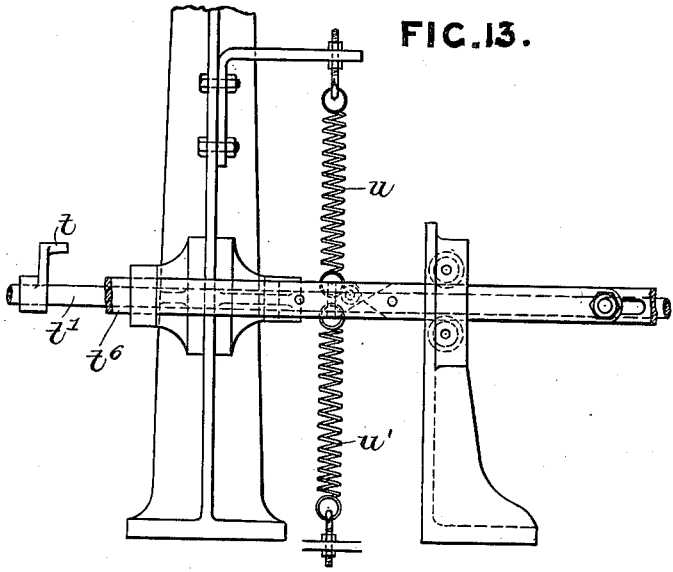
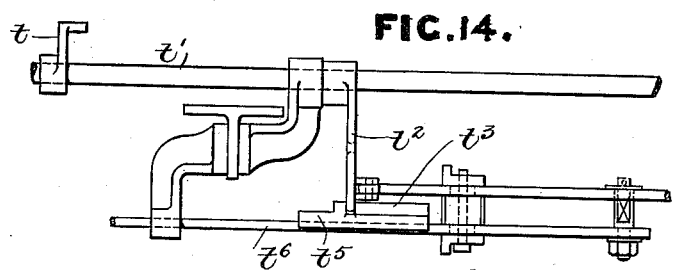
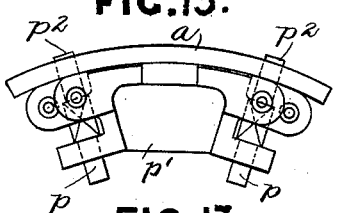
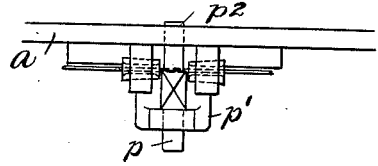
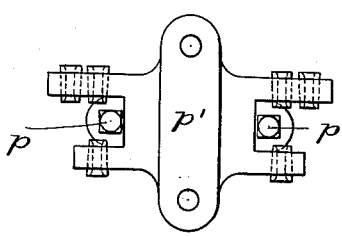
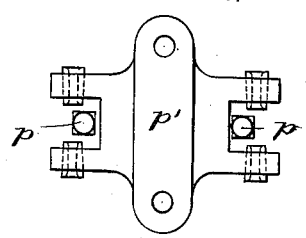

UNITED STATES PATENT OFFICE.

WILLIAM OLIVER LARMUTH, OF SALFORD, ENGLAND.

WIRE-STRANDING MACHINE.

1,073,052.  Specification of Letters Patent.  Patented Sept. 9, 1913.

Application filed October 15, 1910. Serial No. 587,158.

*To all whom it may concern:*

Be it known that I, WILLIAM OLIVER LARMUTH, a subject of the King of Great Britain and Ireland, residing at Todleben Ironworks, Unwin street, Salford, in the county of Lancaster, England, have invented a Wire-Stranding Machine, of which the following is a specification.

This invention relates to improvements in machines employed in the manufacture of wire strands, wire cords, wire ropes, wire cables and the like, in which the single threads of wire or strands of wire are drawn from separate bobbins carried in cradles or cages suitably supported in revolving disks, the threads or strands of wire being thereby twisted into one strand, cord or rope. This is then drawn through a die by means of a hauling off pulley or capstan and wound on a receiving drum or bobbin.

The object of my invention is to construct a machine which, unlike the older type of machine used for the purpose, can be worked at a high rate of speed, and which will thus economize time and labor.

Figure 1:
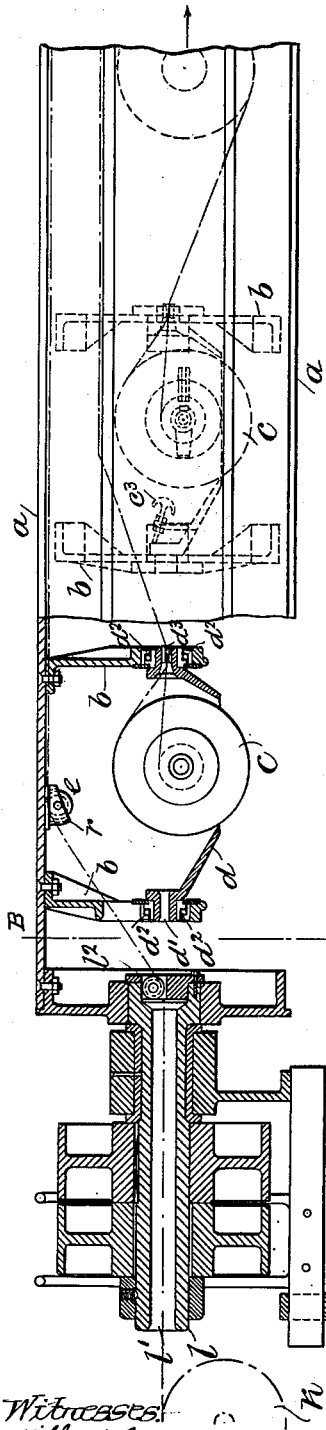
Figure 2:
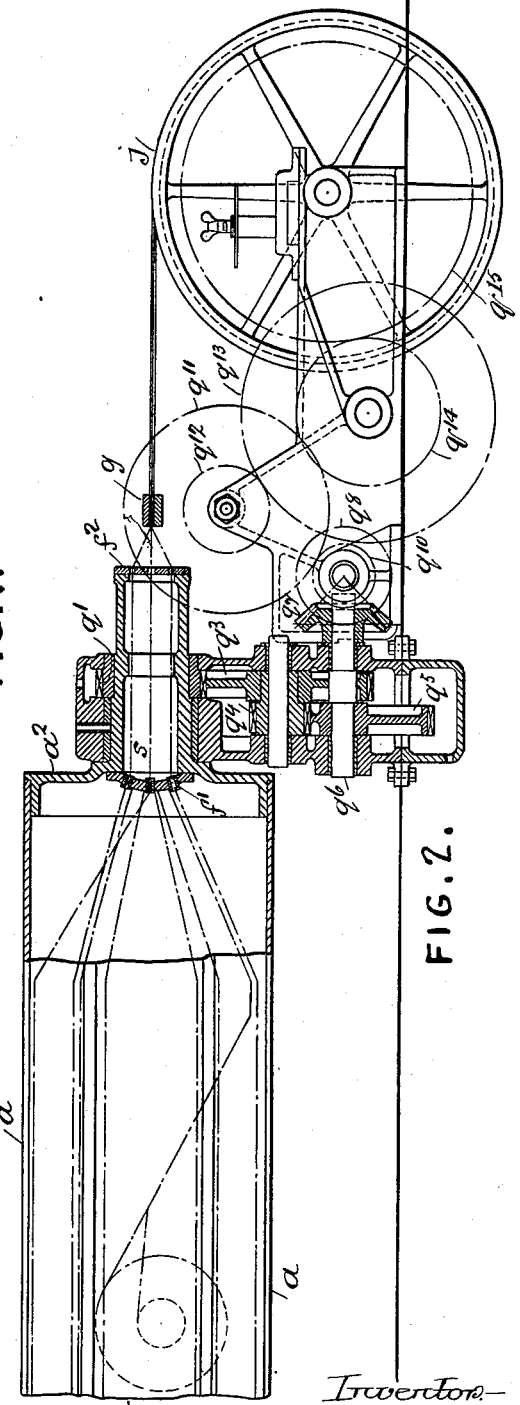
Figure 8:
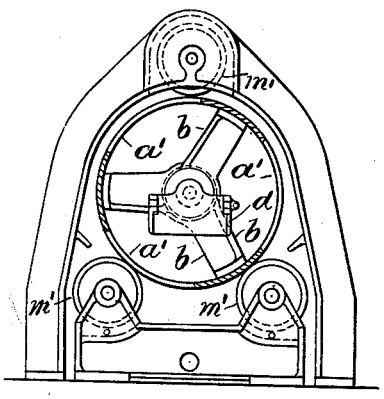
Figure 9:
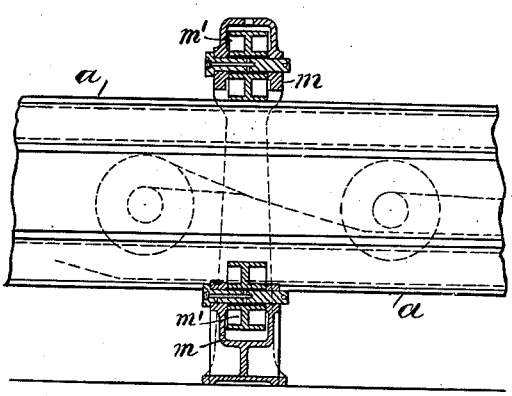
Figure 10:
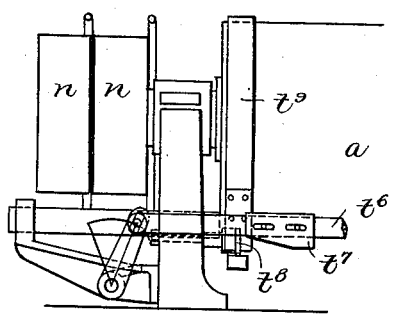
Figure 11:
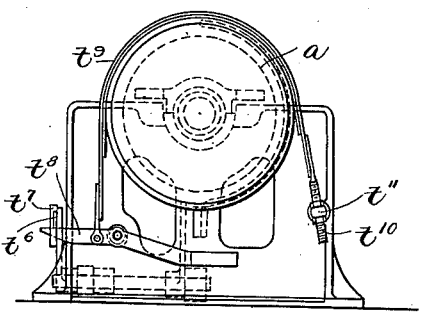
Figure 19:
Figure 20:
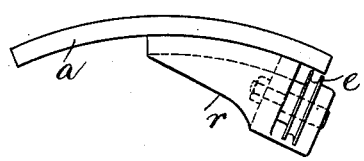
Figure 21:
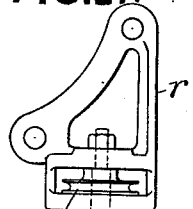
Figure 7:
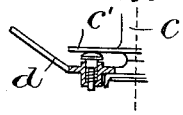

In the accompanying drawings, Figure 1 is a side view partly in section of one end of a wire stranding or twisting machine constructed according to this invention; Fig. 2 is a similar view of the other end of the same machine; Fig. 3 is an outline view of a complete machine; Fig. 4 is a plan of the hauling off pulley or drawing off gear; Fig. 5 is an end view of the gear box; Fig. 6 is a plan of one of the cradles or cages with a bobbin, any number of which can be employed in said machine; Fig. 7 shows a modified form of bobbin drag; Fig. 8 is a transverse section on the line A. A. Fig. 3;
Fig. 9 is a vertical section of the tube support; Fig. 10 is a side view showing the pulleys, strap shifting gear and brake attachment, forming part of my invention; Fig. 11 is a transverse section taken on the line B. B. Fig. 1, showing the brake attachment; Fig. 12 is a transverse section showing the plungers, levers and attachments for the automatic stop motion; Fig. 13 is a side view showing the automatic stop motion rod, levers and attachments; Fig. 14 is a plan of the automatic stop motion rod, lever attachment and its connection with the strap fork and brake lever rods; Figs. 15 to 18 inclusive are views showing details of the automatic plungers and brackets; and Figs. 19 to 21 inclusive are views showing details of the runner bracket for the wires or strands.

According to and for the purpose of this invention, I provide a tube $a$ of wrought iron, steel or other suitable material, which is true in the bore and on the outside surface. This tube has longitudinal spaces $a'$ formed therein at intervals of various lengths, and with two, three or more around the periphery, (preferably three), which allow the bobbins to be placed in position. These openings also facilitate the threading up of the series of strands through the machine, and when equally spaced keep the tube in balance. The material left between the spaces $a'$ enables the brackets $b$ which support the cradles or cages $d$ to be fixed therein at regular or irregular distances apart as required and said brackets are fitted with ball bearings for the journals $d'$ of the cradles or cages $d$, thereby reducing friction, prolonging the life of said cradles or cages and enabling them to remain permanently in a floating position while the tube is being revolved at high speed around them. I place a bobbin $c$ in each of the cradles or cages $d$, with its axis below the axis of the tube and cradle trunnions, and each bobbin has a grooved ring $c^2$ on the outside of one of the flanges $c'$ for the reception of a cord that is passed around said ring. This cord is also connected to an adjustable hook $c^3$ and secured to the cradle or cage in such manner as to place a drag or brake on the bobbin in order to keep the wire or strand taut and prevent the bobbin overrunning when said wire or strand is being drawn therefrom. Those cradles or cages can also be fitted with small spring plungers as shown in Fig. 7, which press on the flanges $c'$ of the bobbins $c$ so as to produce the desired brake or drag, in the place of the ring $c^2$ and hook $c^3$. By having the axis of each bobbin below the axis of the cradle trunnion, the amount of friction set up in the bearings is reduced to a minimum and the bobbins serve as balancing weights to keep the cradles in floating positions.

I fit small pulleys $e$ carried on brackets $r$ (Figs. 19 to 21) inside the tube in advance of each bobbin, and in such positions that when a wire is drawn from the bobbin through the die $d^3$ in the nose end of the cradle or cage $d$, it will be carried at a convenient angle to and over the pulley along the inside of the tube $a$. Between each cradle or cage and the front end of the tube can be placed any number of the brackets $r$ and pulleys $e$, which can have one or more guide-ways for supporting the wires in their course to the end of said tube, where each wire from each bobbin passes through separate dies in and near the edge of a die or plate $f'$ fitted in the end of a revolving head $s$, and through corresponding holes in the lay plate $f^2$.

Under operating conditions, the revolution of the tube $a$ causes the wires to wind around a wire forming the core, which is drawn either from the front bobbin or from the rear end of the machine when carried on a bobbin or drum $k$. The wires thus assembled are drawn through a die $g$ carried in a suitable movable box, by a hauling off pulley or capstan $j$ and wound on a receiving drum or bobbin near the front of the machine.

If the core is drawn from a drum $k$ at the rear end of the machine, it passes through a hole $l'$ in a sleeve $l$ which is part of the end attached to and carrying the tube $a$, then around a pulley $l^2$ and over rollers $e$ fitted on the inside of the tube $a$ similar to the rollers carrying the wires from the bobbins to the end of the machine, where the wires drawn from the bobbins are wound around it as hereinbefore described. The hauling off pulley or capstan is driven by a pinion $q'$ which is keyed on to the head $s$ of the revolving tube $a$ gearing into the wheel $q^3$ keyed on to the boss of the pinion $q^4$. This pinion gears into the wheel $q^5$ on the shaft $q^6$ and the latter carries a bevel wheel $q^7$, gearing into either the wheel $q^8$ or the wheel $q^9$ according to the direction of the rotation of the tube, and giving motion to change wheels $q^{10}$, $q^{11}$, $q^{12}$ and $q^{13}$. These operate the wheel $q^{14}$ gearing into the wheel $q^{15}$ on the shaft $q^{16}$ on which is keyed the hauling off pulley or capstan. An indicator is fixed to the shaft $q^{16}$ to indicate the length of the strand, rope or cable made on the machine.

In order to insure even and steady running and to support the tube $a$, I place around the body of the same a number of sets of three friction rollers $m'$ in bearings $m$ according to the length of the tube and the number of bobbins employed. Power is transmitted to the machine either through a pulley $n$, or when the machine becomes too long to drive at one end, then through bevel or spur gearing at the back and front ends of the tube $a$ and also if necessary at various points between. In such a case, the driving shaft would be placed at the back of the machine, and equipped with fast and loose pulleys, although the power can also be obtained from a direct coupled electric motor.

The machine can be stopped automatically if a wire breaks or a bobbin $c$ runs out, by means of a plunger $p$ in a bracket $p'$, (Fig. 16), which is shown as arranged for two wires. The wire from each bobbin passes through a plunger $p$, which when the wire is perfect is in the position indicated at A (Fig. 12), but when a wire breaks or the bobbin $c$ gives out, the plunger is thrown out by the centrifugal force due to the high speed at which the machine runs. When in this outward position, the end $p^2$ of said plunger engages a lever $t$ keyed on a shaft $t'$ which operates a lever $t^2$ retained in a normal position by tension springs $u$, $u'$. The lever $t^2$ is thus raised out of the groove $t^3$ in the bracket $t^5$, thereby allowing the rod $t^6$ to be moved by a spring connected thereto, and the strap fork to be moved from the fast to the loose pulley. Obviously said rod may be caused to disengage or throw out of service any other device or source of power which might be employed to work the machine in place of the fast pulley.

When the stop motion comes into action and so throws the motive power out of action, it at the same time applies a brake to the main body of the machine, for when the spring moves the rod $t^6$, this rod having an inclined bracket $t^7$ attached, comes into contact with a lever $t^8$ and depresses the same. This at the same time pulls the brake strap $t^9$ which is loose, around the tube $a$, and so tightens it. This strap can be adjusted by a screw $t^{10}$ which is carried in a bracket $t^{11}$ attached to one of the main parts of the machine.

I do not confine myself to any precise number of bobbins I may employ in one machine, as this would be governed by the number of wires or strands, sizes and strength of the strand, cord, rope or cable required. For the purpose of manufacturing strands, cords, or cables I may employ machines of like construction placed end to end, and run together as tandem or otherwise.

Having thus described my invention, what I claim as new and desire to secure by Letters Patent is:—

1. The combination in a stranding machine of a supporting frame; a rigid tube rotatably mounted therein and having openings in its body; a series of cradles rotatably mounted within said tube; a strand supplying bobbin in each cradle; and means for causing strands from the bobbins to be twisted together.

2. The combination in a stranding machine of a supporting frame; an integral cylindrical structure having in its body openings equally spaced circumferentially; a series of cradles rotatably mounted within said structure; a strand supplying bobbin in each cradle; and means for causing strands from the bobbins to be twisted together.

3. The combination in a stranding machine of a supporting frame; an integral supporting tubular structure rotatably mounted therein and having openings in its body; inwardly extending radial brackets fixed to the walls of said tubular structure and having bearings; cradles journaled in said bearings; bobbins respectively mounted in the cradles; and means for causing strands from the bobbins to be twisted together.

4. The combination in a stranding machine of a supporting structure; an elongated pipe rotatably carried by said structure and having a number of series of openings in its walls, the openings of each series being of the same size and equally spaced circumferentially of said pipe; cradles rotatably mounted in the pipe; and strand supplying bobbins respectively carried by cradles, with means for causing strands from the bobbins to be twisted together.

5. The combination in a stranding or spinning machine, of a rotatable tube; a series of cradles pivoted within the tube and each having its axis coincident with the axis of the tube; a strand-supply bobbin in each cradle and each having its axis at right angles and below the axis of the tube; a member having perforations and covering the end of the tube; means for drawing the strands from the bobbins and through the respective perforations; and means for conveying the several strands to receive a twist.

6. The combination in a stranding or spinning machine, of a rotatable tube; a series of cradles pivoted within the tube and each having its axis coincident with the axis of the tube; a strand-supply bobbin pivoted in each cradle; each bobbin having its axis at right angles to and below the axis of the tube; a drag brake on each bobbin; means for guiding the strands from the bobbins and through the tube; means for converging the strands to be twisted; and means for taking up the twisted strands.

7. The combination in a stranding or spinning machine, of a rotatable tube; a series of cradles pivoted within the tube, each of said cradles having its axis coincident with the axis of the tube; a strand-supply bobbin in each cradle, each of said bobbins having its axis at right angles to and below the axis of the tube; a member having perforations and located adjacent the end of the tube; means for drawing the strands from the bobbins and through the respective perforations; means for conveying the several strands to receive a twist; and means for automatically stopping the machine when a strand breaks or when any of the spools become empty.

8. The combination in a stranding or spinning machine, of a rotatable support; a series of cradles pivoted within the support, each of said cradles having its axis conicident with the axis of the support; a strand-supply bobbin in each cradle, each of said bobbins having its axis at right angles to and below the axis of the support; a member having perforations and located adjacent the end of the support; means for drawing the strands from the bobbin and through the respective perforations, and means for conveying the several strands to receive a twist.

In testimony whereof, I have signed my name to this specification, in the presence of two subscribing witnesses.

WILLIAM OLIVER LARMUTH.

Witnesses:
  THOS. PRESCOTT,
  HAROLD WALKER.